(12) United States Patent
Ceekala et al.

(10) Patent No.: US 11,483,517 B2
(45) Date of Patent: *Oct. 25, 2022

(54) SELECTED FORWARDING BETWEEN SERIALLY CHAINED DEVICES

(71) Applicant: Texas Instruments Incorporated, Dallas, TX (US)

(72) Inventors: Vijaya Ceekala, San Jose, CA (US); Xin Liu, Saratoga, CA (US); David Rosselot, Atlanta, GA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/997,216

(22) Filed: Aug. 19, 2020

(65) Prior Publication Data

US 2020/0382744 A1 Dec. 3, 2020

Related U.S. Application Data

(62) Division of application No. 16/420,396, filed on May 23, 2019, now Pat. No. 10,904,478.

(51) Int. Cl.
*H04N 7/10* (2006.01)
*G06F 13/40* (2006.01)
*H04N 7/08* (2006.01)

(52) U.S. Cl.
CPC ......... *H04N 7/104* (2013.01); *G06F 13/4022* (2013.01); *H04N 7/0806* (2013.01); *H04N 7/106* (2013.01)

(58) Field of Classification Search
None
See application file for complete search history.

(56) References Cited

U.S. PATENT DOCUMENTS 7,362,779 B1 4/2008 Zabezhinsky
9,128,690 B2 9/2015 Lotzenburger et al.
(Continued)

FOREIGN PATENT DOCUMENTS

GB 2560570 9/2018
WO 2013090565 6/2013
(Continued)

OTHER PUBLICATIONS

International Search Report in corresponding PCT Application No. PCT/2020/056968, dated Feb. 11, 2021 (2 pages).
(Continued)

*Primary Examiner* — Mohammad S Adhami
(74) *Attorney, Agent, or Firm* — John R. Pessetto; Charles A. Brill; Frank D. Cimino

(57) ABSTRACT

In described examples, a receiver includes a receiver input adapted to receive input data. A selector is coupled to an output of the receiver and is configured to generate a destination indication at an output of the selector. A switch is coupled to the receiver input. The switch is adapted to generate a first transmission at a switch local output in response to an indication of the selector output and the input data. The switch is further adapted to generate a second transmission at a switch system output in response to the input data. The switch local output is adapted to be coupled to a first destination node, and the switch system output is adapted to be coupled to a second destination node.

4 Claims, 4 Drawing Sheets

(56) References Cited

U.S. PATENT DOCUMENTS

| | | | |
|---|---|---|---|
| 9,363,067 B2 | 6/2016 | Ceekala et al. | |
| 10,904,478 B2* | 1/2021 | Ceekala | H04N 21/41422 |
| 10,999,559 B1* | 5/2021 | Pertsel | G06V 10/267 |
| 2001/0012692 A1 | 8/2001 | Miller et al. | |
| 2002/0116705 A1 | 8/2002 | Perlman et al. | |
| 2002/0118696 A1 | 8/2002 | Suda | |
| 2007/0255885 A1 | 11/2007 | Bohm | |
| 2008/0175587 A1 | 7/2008 | Jensen | |
| 2009/0094658 A1* | 4/2009 | Kobayashi | H04N 21/4325 |
| | | | 725/118 |
| 2009/0160868 A1* | 6/2009 | Yato | H04N 21/4113 |
| | | | 345/531 |
| 2009/0278763 A1* | 11/2009 | Zeng | G06F 3/1431 |
| | | | 345/1.1 |
| 2009/0319714 A1 | 12/2009 | James | |
| 2010/0155493 A1 | 6/2010 | Russell | |
| 2012/0062800 A1 | 3/2012 | Sisto et al. | |
| 2013/0191570 A1 | 7/2013 | Lee | |
| 2014/0040477 A1 | 2/2014 | King et al. | |
| 2016/0359741 A1 | 12/2016 | Cooper et al. | |
| 2017/0010329 A1 | 1/2017 | Tang | |
| 2018/0060269 A1 | 3/2018 | Kessler | |
| 2018/0063578 A1 | 3/2018 | Lee et al. | |
| 2019/0044995 A1 | 2/2019 | Amidei et al. | |
| 2019/0289098 A1 | 9/2019 | Chen | |
| 2019/0313053 A1 | 10/2019 | Chane et al. | |

FOREIGN PATENT DOCUMENTS

| | | |
|---|---|---|
| WO | 2014039980 | 3/2014 |
| WO | 2016070197 | 5/2016 |

OTHER PUBLICATIONS

International Search Report in corresponding PCT Application No. PCT/2020/034495, dated Aug. 13, 2020 (2 pages).

International Search Report in corresponding PCT Application No. PCT/2020/034489, dated Jul. 30, 2020 (2 pages).

Kobayashi, DisplayPortTM Ver.1.2 Overview, DisplayPort Developer Conference, Dec. 6, 2010, Westin Taipei, 34 pgs.

Supplemental European Search Report, Application No. PCT/US2020/034489, dated Jul. 15, 2022, 9 pgs.

* cited by examiner

SELECTED FORWARDING BETWEEN SERIALLY CHAINED DEVICES

CROSS-REFERENCE TO RELATED APPLICATION(S)

This divisional application claims priority to U.S. patent application Ser. No. 16/420,396 filed May 23, 2019, which application is incorporated herein by reference in its entirety.

BACKGROUND

In some electronic systems, various components are coupled by a physical layer that can include connectors and electrical wiring. In some applications, limits on the functionality of the various components can be constrained by the cost, size, and numbers of the connectors and/or the cost, size, and numbers of individual wires in the electrical wiring.

SUMMARY

In described examples, a receiver includes a receiver input adapted to receive input data. A selector is coupled to an output of the receiver and is configured to generate a destination indication at an output of the selector. A switch is coupled to the receiver input. The switch is adapted to generate a first transmission at a switch local output in response to an indication of the selector output and the input data. The switch is further adapted to generate a second transmission at a switch system output in response to the input data. The switch local output is adapted to be coupled to a first destination node, and the switch system output is adapted to be coupled to a second destination node.

DETAILED DESCRIPTION

Figure 1:
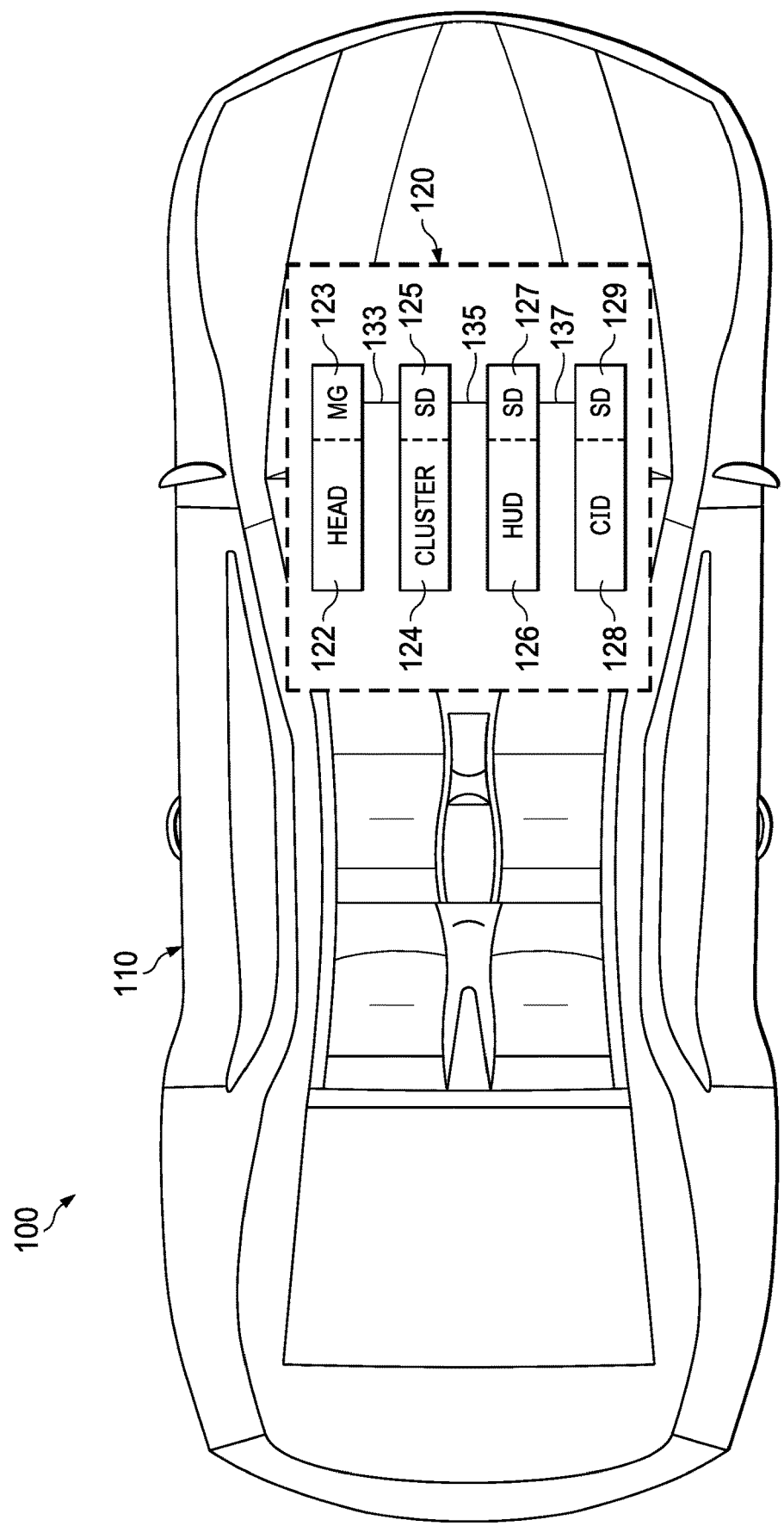
FIG. 1 is a system diagram showing an example vehicle that includes an example system adapted to selectively forward transmissions between serially chained devices of the example system.

In the drawings, like reference numerals refer to like elements, and the various features are not necessarily drawn to scale.

Various electronic systems employ components coupled together to comprise the system. As the functionality of the system increases, the complexities of the interconnections increase. As more functionality is added to the system (e.g., in response to increased integration and processing power), the numbers of terminals of the connectors increase, which, in turn, increase the size, complexity, and/or cost of the connectors.

Some electronic systems can be installed in a transportation platform (such as an airplane or motor vehicle). Limitations in the structure of the mobile platform (e.g., due to human factors, safety considerations, and aerodynamic performance) can limit the space otherwise afforded to the connectors and cabling of an electronic system. Further, access to the connectors and cabling (e.g., for testing, replacement, and/or repair) can be limited (which can increase operating costs), such as when the electronic system is installed in a dashboard (that can include at least one airbag) of a vehicle.

An example of an electronic system that can be installed in a mobile platform is an automotive "infotainment" system, in which video data can be generated by (or otherwise transmitted by) a control unit (e.g., a head-unit or other data source). The generated video data can be transferred to multiple display panels (e.g., a heads-up display, an instrument cluster, and a center-instrument display). To send different types of display data to different displays from a control unit, various cables/connectors are arranged between the control unit and each of the different displays. A cable adapted to convey signals between two units (such as a display and a control unit) has a first connector (e.g., a first set of connectors) adapted to connect to first mating connector(s) of a first unit, a second connector (e.g., a second set of connectors) adapted to connect to a second mating connector(s) of a second unit, and a cable harness (e.g., flexible cable harness) having insulated wiring arranged to electrically couple signals (e.g., unidirectional and/or bidirectional signals) between the first and second connectors.

In an example, multiple displays can be connected to the control unit in a one-to-many configuration with the connecting cables converging upon the control unit at a single location (e.g., a surface of the control unit). For example, a master control unit can include a connector and cable pair for communicating with each slave device of the system (e.g., in a star-network topology). The convergence of the connectors and cables at the control unit creates mechanical spacing issues in which the convergence of multiple connectors located side-by-side occupy significant space in an automobile vehicle. Further, video information (e.g., such as at least one video stream) from a control unit is high-resolution data that is streamed continuously to respective displays via a respective connector/cable pair. Because of the point-to-point connections of the star topology, each video stream need not be associated with networking addresses or be otherwise identified. Conventionally, video data from a head unit that is being transferred to displays is high resolution data being streamed continuously and is not in a format that can be readily networked, as in some other data-networking applications.

As described herein, an example system is adapted to selectively forward transmissions between serially chained devices of the example system. For example, the example system can include a control unit coupled to a serial chain (e.g., one end of a serial chain) of display units. An example multistream generator can be coupled to an output of the control unit, so that the example multistream generator can encode (e.g., encapsulate) video data from multiple streams into a format adaptable to different types of displays in the serial chain (e.g., daisy-chained displays). The mechanical spacing issues of congestion due to cable/connector convergence at a control unit location can be alleviated by arranging the example system components as shown in FIG. 1.

FIG. 1 is a system diagram showing an example vehicle that includes an example system adapted to selectively forward transmissions between serially chained devices of the example system. Generally described, the system 100 is an example system that includes a host vehicle 110. An example multiple display system 120 can be installed in the host vehicle 110. The example multiple display system 120 can include any number of displays in a serial chain, one end of which can be connected to a control unit.

An example multiple display system 120 can include a control unit (e.g., head unit 122), a first display (e.g., instrument cluster display CLUSTER 124), a second display (e.g., heads-up display HUD 126), and a third display (e.g., center-instrument display CID 128). The example multiple display system can include one or more head units 122. A head unit 122 is adapted to receive sensor data (e.g., from cameras or instrumentation sensors) and generate video streams in response to the sensor data. Each head unit 122 transmits at least one generated video stream, each of which is received by the multistream generator 123. However, the use of multiple head units increases system complexity, creates additional nodes of failure, increases costs, and occupies more space, for example, in confined areas.

The multistream generator 123 (MG) can have an input (e.g., video input) coupled to (e.g., can be included by) the head unit 122 and can have an output coupled (e.g., via cable 133) to an input of the stream disaggregator 125. In an example, the multistream generator 123 can receive a video stream from a respective head unit 122. In some examples, the multistream generator 123 can receive a video stream from at least one head unit 122 (e.g., so that one or more video streams can be generated by a head unit 122 for stream aggregation by the multistream generator 123).

The stream disaggregator 125 can have a first output (e.g., local output) coupled to (e.g., can be included by) the display CLUSTER 124) and can have a second output (e.g., system output) coupled (e.g., via cable 135) to an input of the stream disaggregator 127.

The stream disaggregator 127 can have a first output (e.g., local output) coupled to (e.g., can be included by) the display HUD 126) and can have a second output (e.g., system output) coupled (e.g., via cable 137) to an input of the stream disaggregator 129.

The stream disaggregator 129 (SD) can have a first output (e.g., local output) coupled to (e.g., that can be included by) the display CID 128) and can have a second output (e.g., system output) optionally coupled (e.g., via another cable, not shown) to an input of an optional stream disaggregator (not shown) for display. Other stream disaggregators can be successively concatenated to the tail of the serial chain connecting the serially chained displays (e.g., where the tail of the serial chain is opposite to the end of the serial chain connected to the head unit 122). (An example cabling network is described hereinbelow with respect to FIG. 4.)

As compared against a star-topology display system for three displays (which includes three cables and respective connectors converging at a location of the control unit), the serially chained display system described herein alleviates space and mechanical constraints, (e.g., so that the constraints are reduced to the space of having a solitary connector/cable connected at the head unit 122).

The multistream generator 123 is arranged to encode high-resolution, real-time video data (including video-associated data) into a packet format. Operation of a multistream generator is described hereinbelow with reference to FIG. 3. The multistream generator 123 can be arranged as a serializer (e.g., which is adapted to serially output video data, where the video data can be received asynchronously by the multistream generator 123 in a serial or parallel format) and/or can be arranged to output the video data in a parallel manner. Each packet can include an identifier (e.g., stream identifier) for identifying a particular video stream being encoded and/or for identifying a destination of the packet (e.g., identifying the display to which the packet is addressed). The identifier can be parsed by a stream disaggregator in accordance with a mode (e.g., a default or programed configuration) associated with a respective stream disaggregator. Each packet is received by at least one stream disaggregator for forwarding (and/or decoding/deserializing).

A stream disaggregator (e.g., 133, 135, and 137) is arranged to receive the packet (e.g., which has an identifier for indicating a destination display) and to select between a stream disaggregator first output (e.g., a local output for coupling information to a locally coupled display) and a stream disaggregator second output (e.g., a system output for forwarding information to at least one other stream disaggregator).

Figure 2:
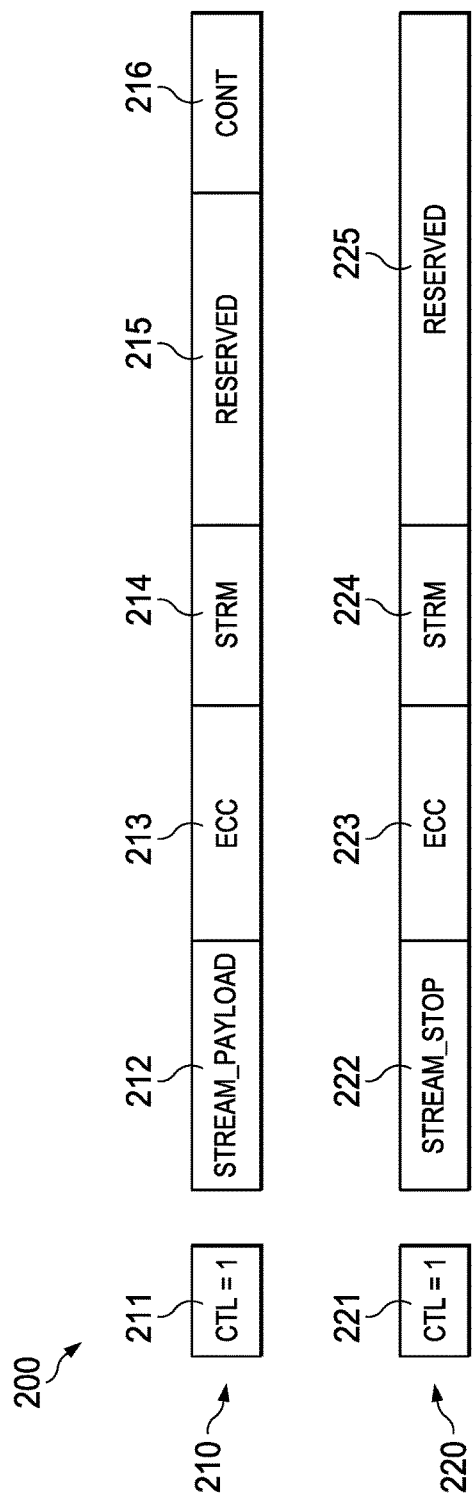
FIG. 2 is a diagram of example transmissions in an example system adapted to selectively forward transmissions between serially chained devices.

FIG. 2 is a diagram of example transmissions in an example system adapted to selectively forward transmissions between serially chained devices. Generally described, the transmissions 200 are example transmissions that are arranged in a packet format. The example transmissions can include streaming data for streaming video. The streaming video data can include audio data coupled to (e.g., synchronized with) the streaming video. The streaming data can include content for displaying moving and/or stationary images.

In a first example packet (such as packet 210), the packet 210 includes a control (CTL) field 211, a payload (e.g., STREAM PAYLOAD) field 212, an error-correction code (ECC) field 213, a stream/destination (STRM) field 214, a reserved field 215, and a continuation (CONT) field 216.

The field 211 can indicate whether the stream payload (e.g., field 212) includes command data or streaming data. Command data included by the field 212 can include: a start command, for example, for starting a playing of a selected video stream; a configuration command, for example, for configuring modes, selecting a particular protocol (e.g., from amongst various proprietary or industry standards) by which a particular stream disaggregator communicates with a connected local display (e.g., directed cabled local display), setting a playback channel for a particular display (e.g., for playing at least one selected stream that includes a selected STRM field 214 value); a routing command for selecting at least one stream to be routed to a local display (e.g., of a particular stream disaggregator); and/or a forwarding command for selecting at least one stream to be forwarded to another stream disaggregator (e.g., so that a first disaggregator forwards a selected stream to a second stream disaggregator that is downstream from the first stream disaggregator and a head unit). In an example, configuration data can be preprogramed (e.g., at system integration, such as at a car factory) into a particular stream disaggregator (e.g., so that configuration time is reduced) and command data can be used in operation to reprogram a given configuration (e.g., whether the given configuration is preprogramed or programed in operation).

Streaming data included by the field 212 can include video (e.g., still or moving video) information, audio information, or combinations thereof. The resolution of the streaming data can be selected to provide a video (and/or sound) quality commensurate with a particular display and/or target functionality. Streamed video data can include pixel information. An example pixel can include 8 bits of red information, 8 bits of green information, and 8 bits of blue information. The numbers of rows and columns of pixels can be selected to generate a video frame that corresponds to the capabilities of a particular display screen. A video frame can be encoded as transmission symbols and/or as compressed information for transmission and subsequent decoding by a target display. The video frames can be streamed (e.g., transmitted as a temporal sequence of video frames associated with a particular video "feed").

The field 213 includes an ECC code (e.g., for error detection and correction). The number of the bits of field 213 can be increased (e.g., from a one-bit parity bit to larger numbers of bits) to provide increasing levels of detection—and even correction—of errors that can occur in the packet 210 that is being transmitted and received. A receiver can evaluate the ECC code of a received packet against other bits of the received packet, for example, to correct a corrupted packet and/or request (e.g., by transmitting upstream) a retransmission of the original packet (e.g., the original packet data). The length of the ECC field can be selected to provide a level of performance for a particular functionality (e.g., for dashboard displays as compared against a less-critical infotainment display unit for viewing by a back-seat passenger).

The field 214 includes information that helps identify the display to which a received packet is to be routed. The number of bits in the field 214 is sufficient to uniquely identify a particular stream (e.g., video channel) and/or display (e.g., at least one display for consuming and playing back a stream associated with the received packet). In a first example: the field 214 includes sufficient bits to identify a particular stream (e.g., a channel number), where the stream disaggregators are programmed (e.g., via the herein-described configuration commands) to route the received packet to at least one display (e.g., that is set to the channel number, so that more than one display can playback the same stream). In a second example: the field 214 includes sufficient bits to identify a particular display (e.g., an instrument panel or an electronic side-view "mirror" display) upon which the particular received packet is to be displayed. In a third example: the field 214 includes sufficient bits to indicate a code for selecting a predefined routing configuration for consuming (e.g., routing to a local display) and/or forwarding the particular received packet. In a fourth example, the field 214 includes sufficient bits to include combinations (e.g., some or all combinations) of the functionality described herein for the first, second, and third examples.

The field 215 is reserved for conveying data for an undefined (e.g., unpublished or not-yet published) purpose. For example, a reserved field does not necessarily carry useful data in an earlier system but could be used to convey useful information in a later system, so that the packet length need not be changed to make room for carrying the later-implemented information. The field 215 can include sufficient bits to extensibly transmit and receive for packets having a common packet length (e.g., in accordance with a follow-on protocol standard related to at least one existing FPD standard or in accordance with a later-developed proprietary protocol).

The field 216 indicates whether the packet is the last packet in a stream. In an example where the field 216 indicates the last packet in a steam, a display consuming the packet can take an action in response to the indication that the particular received packet is the last packet in a stream. An example action (e.g., that is taken in response to the indication that the particular received packet is the last packet in a stream) can be a provisional action (e.g., a quickly reversible action) such as dimming a display selected to display a stream associated with the particular received packet. Packet transmission and forwarding is described hereinbelow with reference to FIG. 4.

In a second example packet (such as packet 220), the packet 220 includes a control (CTL) field 221, a stop (e.g., STREAM STOP) field 222, an error-correction code (ECC) field 223, a stream/destination (STRM) field 224, and a reserved field 225.

The field 221 can indicate whether the stream payload includes command data (such as a stop command of field 222). Command data included by the field 222 can include the stop command. In response to a transmitted stop command, downstream stream disaggregator(s) and display(s) identified by the field 224 can power-down, reinitialize, and/or reallocate resources previously allocated for displaying the stream associated with the received packet (e.g., the packet that includes the stop command). In an example, the field 222 can include commands for terminating operation of programmable hardware adapted to display video information (e.g., a code in the stop field 222 can indicate the instant packet is the last packet in a video stream indicated by the field 224).

The field 223 includes an ECC code (e.g., for error detection and correction) such as a code include by the field 213.

The field 224 is a field similar to field 214 and can include information for indicating which stream is associated with the packet and/or for indicating the display to which the packet is to be sent.

The field 225 is a field similar to field 215. A continuation field, such as field 216, need not be implemented in a packet that include a stop field because the presence of a stop field can be used to determine that a packet that includes a stop field is the last packet in the stream. Using the stop field to infer that the stream is to be terminated frees the space otherwise used by the continuation field in a packet having a stop field to be reserved for a potential future use (e.g., a future use for an arbitrary purpose).

Figure 3:
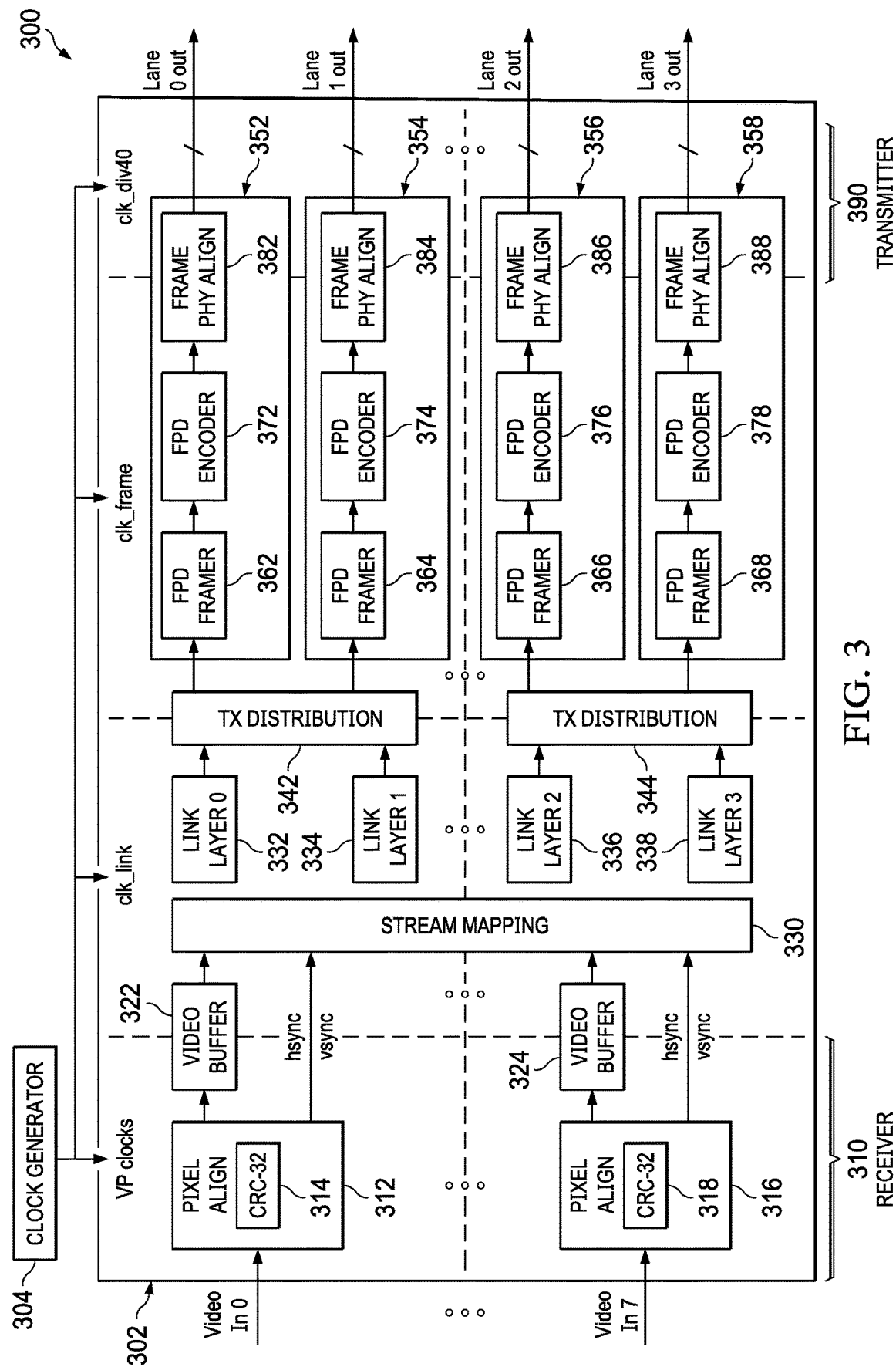
FIG. 3 is a block diagram of an example multistream generator adapted to aggregate input streams in an example system adapted to selectively forward transmissions between serially chained devices.

FIG. 3 is a block diagram of an example multistream generator adapted to aggregate input streams in an example system that is adapted to selectively forward transmissions between serially chained devices. The multistream generator 300 is an example multistream generator that can be arranged on a substrate 302. The multistream generator 302 includes an input (e.g., a receiver 310) that is adapted to receive at least one video stream from a selected head unit and an output (e.g., a transmitter 390) that is adapted to forward packetized video stream(s) to a first stream disaggregator. The packetized video streams can be generated (e.g., sourced) by a video source (such as a digital camera) in accordance with a MIPI (mobile industry peripheral interface) camera serial interface (CSI). The video sources for generating the example video 0 through video 7 streams can include sensors (e.g., sensors 402), which can include various cameras such as backup or side-view cameras, where each camera can be arranged to generate a respective video stream. The video sources for generating the example video 0 through video 7 streams can also include the head unit (e.g., head unit 401) itself, which can generate, in response to sensors such as sensors 402, at least one video stream for display (as described hereinbelow with respect to FIG. 4).

In one example, the clock generator 304 is arranged on the substrate 302 and is adapted to generate clock signals such as video pixel clocks (VP clocks), video link layer clocks (vclk_link), frame clocks (clk_frame), and lane clocks (clk_div40). In some examples, some of the clock signals can be generated by circuitry not included on the substrate 302. Moreover, the architecture of the multistream generator is scalable (e.g., by powers of two), so that the multistream generator can aggregate a selected number (e.g., eight or more) of video streams (which can be addressed by including a sufficient number of bits in field 214 and field 224). In some examples, the receiver can include a transmitter, so that information can be transmitted (e.g., in a second, opposite direction) from an example receiver 310. The multistream generator 300 can be adapted transfer data bidirectionally (e.g., at 165 megabits per second upstream or at 13 gigabits per second downstream), where an example of bidirectional transmission/reception of transferred data is described in U.S. Pat. No. 9,363,067, issued Jun. 7, 2016, entitled "Data Signal Transceiver Circuitry for Providing Simultaneous Bi-Directional Communication Via a Common Conductor Pair," the entirety of which is incorporated herein by reference.

For a first video stream (e.g., Video In 0) in the example multistream generator 300, a pixel aligner 312 is adapted to sample a first video transmission, to align (e.g., synchronize) the sampled data with an internal clock (e.g., a VP clock) of the multistream generator 300, and to generate horizontal synchronization (hsync) and vertical synchronization (vsync) information (e.g., for identifying pixel location of received pixel data). The sampled data is validated by checking for errors (and correcting, if possible) by 32-bit cyclical redundancy checker (CRC) 314. The validated information is stored in the video buffer 322 and is temporally associated with hsync and vsync information, so that, for example, start and stop packets can be respectively associated with the beginning and the end of a video frame to be displayed. The video stream can be received (e.g., from a head unit) as a serial or parallel stream, accessed from system memory (e.g., frame memory), and/or transmitted/accessed by combinations thereof.

The stream mapper 330 is adapted to receive stream (e.g., Video In 0 stream) information from the video buffer 322 and the associated hsync and vsync signals. In response to the video buffer 322 information and the associated hsync and vsync signals, the stream mapper 330 is configured to associate a particular video stream with a particular display (e.g., by setting the value of a STRM field such as field 214 or field 224).

The lane-0 link layer 332 is arranged to generate signals (for example) adapted to control physical layer parameters for transmitting data on lane-0 in accordance with a system protocol (e.g., FPD protocol, which is described hereinbelow). The lane-1 link layer 334 is arranged to generate link control signals (for example) adapted to control physical layer parameters for transmitting data across lane-1 in accordance with a system protocol. The link control signals can be generated in synchronization with (e.g., in response to) the video link layer clocks.

Packets from a particular stream (e.g., Video In 0 stream) can be transmitted across either lane-0 or lane-1 in response to an assignment made by the transmission distributor (TX distributor) 342. The TX distributor 342 can allocate at least one transmission lane, so that pixels of a video frame can be transmitted at a rate sufficient to fulfill frame rates of the display indicated by the STRM field. A first output of the TX distributor 342 is coupled to transfer lane-0 data to an input of the framer 352, and a second output of the TX distributor 342 is coupled to transfer lane-1 data to an input of the framer 354. The pixels of a video frame can be transmitted in synchronization with a frame clock. In some examples, a particular lane can be associated with a respective display (e.g., as a system design choice), so that a video stream can be associated with (e.g., forwarded to) a respective display. In some examples, lanes can be dynamically assigned on the basis of network traffic, so that a lane can carry different video streams (e.g., where a stream disaggregator is adapted to associate received packets of a particular video stream with a particular display and, in response, to forward/transmit packets of a given video stream towards the correct display).

The framer 352 and framer 354 are adapted to generate transmission frames in accordance with a system protocol, such as a low-voltage differential-signaling (LVDS) protocol. The system protocol can be an LVDS standard, such as a flat-panel display link (FPD) protocol (e.g., FPD-Link I, FPD-Link II, FPD-Link III, and any follow-on standard related to at least one existing FPD standard). The system protocol can also include a "sub-LVDS standard," current-mode and/or voltage mode drivers/receivers, and other such low power, high-speed signaling protocols (including a gigabit multimedia serial link—GMSL). The FPD framer 362 is adapted to align data for transmission within a transmission frame, the FPD encoder 372 is adapted to encode the aligned data as symbols for transmission within the transmission frame, and the FPD frame physical aligner (FRAME PHY ALIGN) 382 is adapted to buffer the encoded symbols for synchronous transmission (e.g., as clocked by a lane clock) by transmitter 390 across lane-0. The FPD framer 364 is adapted to align data for transmission within a transmission frame, the FPD encoder 374 is adapted to encode the aligned data as symbols for transmission within the transmission frame, and the FPD frame physical aligner (FRAME PHY ALIGN) 384 is adapted to buffer the encoded symbols for synchronous transmission by transmitter 390 across lane-1. The encoded symbols can be decoded, for example as described hereinbelow, by a receiver such as receiver 422 and encoded by a stream forwarder (e.g., stream transmitter) such as stream forwarder 426.

For a second video stream (e.g., Video In 7) in the example multistream generator 300, a pixel aligner 316 is adapted to sample a video transmission, to align the sampled data with an internal clock of the multistream generator 300, and to generate horizontal synchronization (hsync) and vertical synchronization (vsync) information. The sampled data is validated by checking for errors by 32-bit cyclical redundancy checker (CRC) 318. The validated information is stored in the video buffer 324 and is temporally associated with hsync and vsync information, so that, for example, start and stop packets can be respectively associated with the beginning and the end of a video frame to be displayed.

The stream mapper 330 is adapted to receive stream (e.g., Video In 7 stream) information from the video buffer 324 and the associated hsync and vsync signals. In response to the video buffer 324 information and the associated hsync and vsync signals, the stream mapper 330 is configured to associate a particular video stream with a particular display (e.g., by setting the value of a STRM field such as field 214 or field 224).

The lane-2 link layer 336 is arranged to generate signals (for example) adapted to control physical layer parameters for transmitting data on lane-2 in accordance with a system protocol. The lane-3 link layer 338 is arranged to generate signals (for example) adapted to control physical layer parameters for transmitting data across lane-3 in accordance with a system protocol.

Packets from a particular stream (e.g., Video In 7 stream) can be transmitted across either lane-2 or lane-3 in response to an assignment made by the transmission distributor (TX distributor) 344. The TX distributor 344 can allocate at least one transmission lane, so that pixels can be transmitted at a rate sufficient to fulfill frame rates of the display indicated by the STRM field. A first output of the TX distributor 344 is coupled to transfer lane-2 data to an input of the framer 356, and a second output of the TX distributor 344 is coupled to transfer lane-1 data to an input of the framer 358.

The framer 356 and framer 358 are adapted to generate transmission frames in accordance with a system protocol, such as a low-voltage differential-signaling (LVDS) protocol. The system protocol can be an LVDS standard, such as the fourth revision of the flat-panel display link (FPD) protocol. The FPD framer 366 is adapted to align data for transmission within a transmission frame, the FPD encoder 376 is adapted to encode the aligned data as symbols for transmission within the transmission frame, and the FPD frame physical aligner (FRAME PHY ALIGN) 386 is adapted to buffer the encoded symbols for synchronous transmission by transmitter 390 across lane-2. The FPD framer 368 is adapted to align data for transmission within a transmission frame, the FPD encoder 378 is adapted to encode the aligned data as symbols for transmission within the transmission frame, and the FPD frame physical aligner (FRAME PHY ALIGN) 388 is adapted to buffer the encoded symbols for synchronous transmission by transmitter 390 across lane-3.

Other video inputs (e.g., Video In 2 through Video In 6) and lane outputs (e.g., Lane-4 through Lane-15) and circuitry can be included, so that system bandwidth is sufficient to handle (for example) larger numbers of displays (e.g., for instrumentation, side and rear views, navigation, and infotainment systems for passengers) and/or increased resolutions. As described hereinbelow with reference to FIG. 4, the output (e.g., multistream output) is coupled to at least one stream disaggregator for coupling a selected video stream to the respective local display. A local display need not be coupled to any stream disaggregator, although cabling requirements (e.g., numbers of connectors, cables, and/or conductors) in systems with multiple displays and video streams are increased for cabling a local display not coupled to a stream disaggregator.

Figure 4:
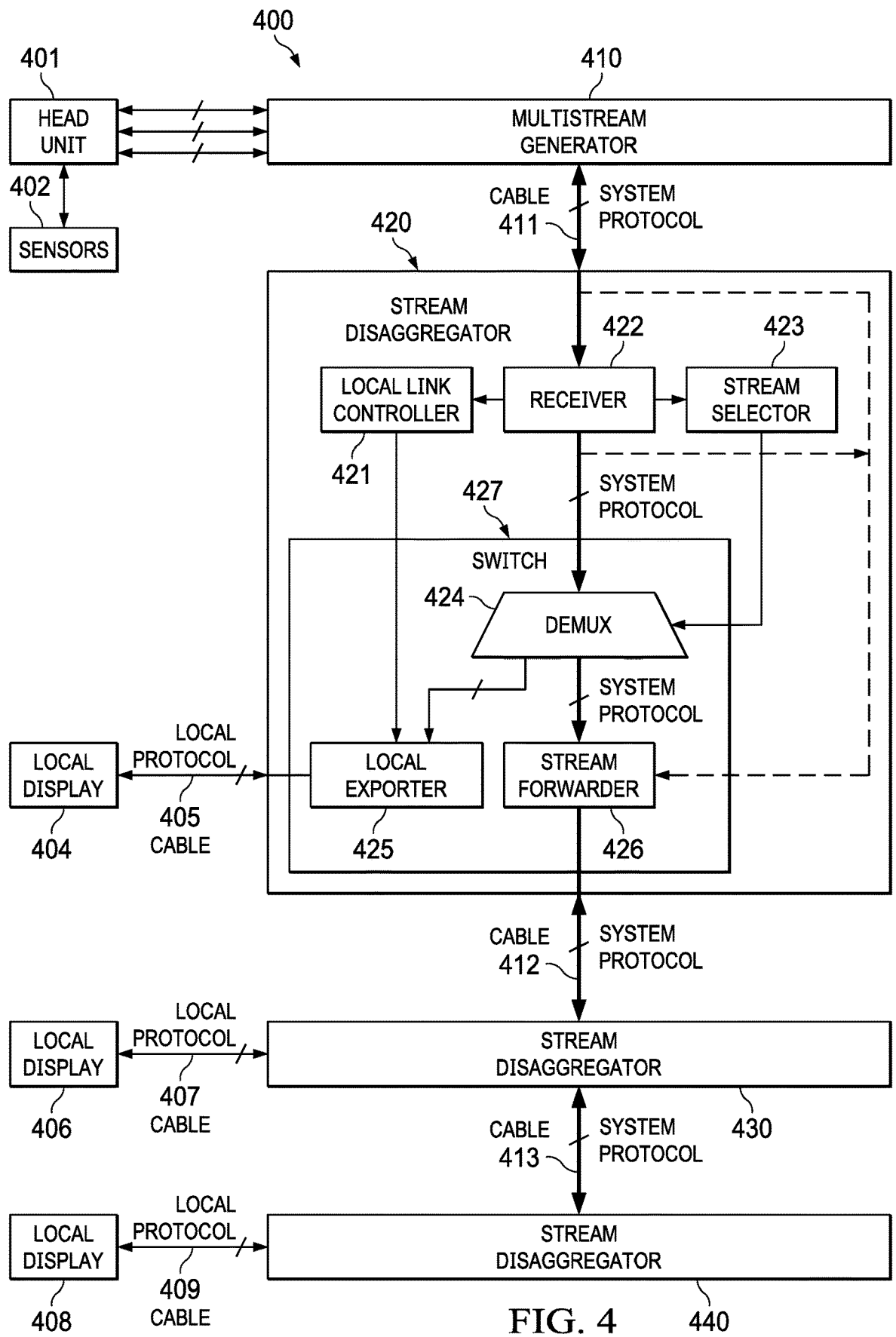
FIG. 4 is a block diagram of an example system that includes at least one stream disaggregator adapted to selectively forward transmissions between serially chained devices.

FIG. 4 is a block diagram of an example system that includes at least one stream disaggregator adapted to selectively forward transmissions between serially chained devices. For example, the system 400 is an example system that includes a head unit 401, a multistream generator 410, a stream disaggregator 420 (e.g., coupled locally to local display 404 via cable 405), a stream disaggregator 430 (e.g., coupled locally to local display 406 via cable 407), and a stream disaggregator 440 (e.g., coupled locally to local display 408 via cable 409). The stream disaggregators 420, 430, and 440 can be adapted transfer data bidirectionally (e.g., at 165 megabits per second upstream or at 13 gigabits per second downstream).

In an example, the head unit 401 is coupled to receive sensor information from sensors 402. The sensors 402 can be a suite of sensors associated with electronic systems of a vehicle (e.g., vehicle 110). Such sensors can include sensors adapted to sense positions of driver controls (e.g., gear shift, lights, steering wheel, turn signal lever, and other controls), vehicle attributes (e.g., speed, gas level, temperature, fuel flow, tire pressure, seat belts, and other attributes), and positioning (e.g., radar, satellite navigation, cameras, lane and curb sensors, and other relational information). The head unit 401 is adapted to generate output information (e.g., video information) in response to the sensor information. Additional head units 401 can be coupled various sensors 402 and the multistream generator 410.

The head unit 401 is adapted to generate video information for display on the local display 404 (e.g., which can be a CLUSTER 124), the local display 406 (e.g., which can be a heads-up display HUD 126), and the local display 408 (e.g., which can be a center-instrument display CID 128). For example, the head unit can generate: a first video stream of a vehicle dashboard in operation (e.g., for display on a display panel for replacing mechanical gauges); a second video stream for a HUD (e.g., to display navigation information on a virtual screen on a windshield); and a third video stream for a CID (e.g., to display real-time images from a rearward-facing backup camera). The head unit 401 is adapted to output the video streams as individual bit streams, for example.

The multistream generator 410 is a multistream generator such as the multistream generator 300, described hereinabove. The multistream generator 410 is coupled to the video outputs (e.g., each of the video outputs) of the head unit 401 and is adapted to combine independent video streams (e.g., of at least two) of the video streams received from the head unit 401 into a unified (e.g., multistream) video stream using a system protocol. The multistream generator is adapted to packetize information from the unified video stream (which includes information of at least two video streams, for example) and to transmit the unified video stream (multi stream). Accordingly, the multistream generator is arranged as a source node of the unified video stream.

The individual packets (generated by the multistream generator) each include an identification field, such as a STRM identifier that can identify a selected display (e.g., addressed display and/or addressed node) as the destination of the packet. The multistream generator 410 is adapted to couple the encoded packets to a source output (e.g., of a source node) of the multistream generator 410. A first cable (411) is connected between the multistream generator 410 (e.g., source node) and a first stream disaggregator (e.g., stream disaggregator 420). The first cable includes conductors (and associated insulators/shielding) sufficient to carry information for all lanes (e.g., at least one lane) over which video information is transmitted.

The stream disaggregator 420 includes a local link controller 421, a stream input (such as receiver 422), a stream selector 423, a demultiplexer (DEMUX) 424, and a transmitter 427 (which includes a local exporter 425 and a stream forwarder 426). The receiver 422 can comprise a physical layer receiver, the local exporter 425 can comprise a physical layer driver, and the stream forwarder 426 can comprise a physical layer driver. The receiver 422 has a receiver output. The receiver 422 has a receiver input adapted to receive input data (e.g., the unified video stream) from an output of a source node (e.g., the multistream generator 410). The input data can be (and/or include) an incoming packet that includes an identification field, wherein the incoming packet is transmitted by the source node. The input data can be received as serial or parallel data. The input data is received in accordance with a system protocol (e.g., an FPD protocol) that is different from the local protocol (e.g., an eDP protocol, described hereinbelow).

The stream selector 423 includes a selector output. The stream selector 423 is coupled to a receiver output (e.g., of the receiver 422), and the stream selector 423 is configured to generate a destination indication at the selector output (e.g., of the stream selector 423). For example, the stream selector 423 is adapted to monitor the receiver 422 for received transmissions (e.g., packet 210 and packet 220) for STRM field contents (e.g., which can include functional data) and to program the demultiplexer (DEMUX) 424 in response. In an example, the stream selector 423 is adapted to generate the destination indication in response to the identification field (the stream selector 423 is optionally adapted to receive an identification field.

The switch 427 includes a switch local output and a switch system output. The switch 427 is coupled to the output of the receiver 422 (or optionally coupled to the input of the receiver 422) and is adapted to generate a transmission (e.g., output signal) at the switch local output (e.g., a first output of the switch) in response to an indication of the stream selector 423 output and the input data, and is adapted to generate a transmission at the switch system output in response to the input data. The switch local output is adapted to be coupled to a first destination node, and the switch system output is adapted to be coupled to a second destination node. For example, the switch 427 is adapted to generate, in response to the identification field, an output packet adapted to be transmitted at the switch local output (e.g., the local exporter 425) when, for example, the identification field indicates that the packet is to be exported to the local display 404. In one example, the switch 427 is adapted to route, in response to the destination indication, the input data to the switch system output (e.g., the stream forwarder 426) when, for example, the destination indication at the output of the stream selector 423 indicates that the packet is to be forwarded to another display (e.g., that the packet is not to be exported to the local display 404). In another example, the switch 427 forwards (e.g., transmits) all input data received by the stream disaggregator 420, where the input data is coupled from the receiver input 422 (where the coupling can include coupling the input data through the receiver 422 itself and the receiver 422 output), so that a transmission at the switch system output is generated by the switch 427 in response to the input data (e.g., irrespective of the stream field 214 and 224 contents).

The demultiplexer 424 includes a first output that is adapted to be coupled to a first destination node, and the demultiplexer 424 includes a second output that is adapted to be coupled to a second destination node. For example, the demultiplexer 424 includes a first output that is adapted to be coupled via the local exporter 425 to the local display 404. The first destination node is a local (e.g., local to the stream disaggregator 420 instance) node address that can be associated with at least one display node address. In the example, the demultiplexer 424 includes a second output that is adapted to be coupled via the stream forwarder 426, the cable 412, and the stream disaggregator 430 to the local display 406 (for example). The second destination node is a nonlocal node address can be associated with a display node address that indicates a node address other than a node address associated with the first destination node. The node addresses can be logical addresses of the various display nodes, whereas the stream field contents identify a particular video stream (which, for example, can be received selectively received by one or more displays having different logical addresses). A stream selector can be dynamically programmed (e.g., in response to a received control packet) to direct a selected video stream to the local display associated with the stream selector. The stream forwarder 426 is coupled to the switch system output, and the stream forwarder is adapted to transmit in accordance with the system protocol.

In an example, the demultiplexer 424 is adapted to couple (e.g., by switching), in response to the destination indication, the incoming packet to the first output of the switch and the second output of the switch. In an example, the demultiplexer 424 is adapted to generate, in response to the identification field, a packet at a selected one of the at least the first output of the switch and the second output of the switch. In an example, the demultiplexer 424 is adapted to generate a packet destination indication in response to an identification field of the incoming packet.

The local link controller is a local controller coupled to the switch local output, wherein the switch local output is adapted for transmitting to a display. The local link controller 421 is adapted to monitor the transmissions (e.g., packet 210 and packet 220) received by the receiver 422 for commands (e.g., functional data). The local link controller 421 is adapted to control a transmission of packets from the switch local output in accordance with a local protocol (e.g., which is a protocol that is different from the system protocol).

The local exporter 425 is coupled to the first output of the demultiplexer 424, wherein the local exporter 425 includes an exporter output adapted for coupling to a display. For example, the first output of the demultiplexer 424 is coupled to an input of the local exporter 425. An exporter output of the local exporter 425 can be coupled (e.g., connected) to the local display 404.

The output of the local exporter 425 includes a local protocol. In an example, the local protocol is a display port protocol such as the Video Electronics Association of America (VESA) embedded DisplayPort (eDP) standard. Accordingly, the input data can be received by the receiver 422 in accordance with a system protocol (e.g., FDP) that is different from at least one local protocol. Other display port protocols that can be supported as local protocols include: the DisplayPort (DP); the open liquid crystal display interface (OpenLDI); and the mobile industry processor interface (MIPI) display serial interface (DSI) and camera serial interface (CSI). A first local protocol (e.g., 405) of a first display (e.g., 404) can be a different protocol from a second local protocol (e.g., 407) of a second display (e.g., 406).

The stream disaggregator 420 can be programmed to operate in accordance with a protocol associated with the particular display locally coupled to the local exporter 425. For example, the multistream generator 410 can configure the stream disaggregator 420 by transmitting a start command to the local link controller 421 that includes an indication of the selected protocol. The indication of the selected protocol can be included within a stream payload 212, for example. In an example system, a first stream disaggregator (e.g., 420) is adapted to select a first local protocol (e.g., 405) and a second stream disaggregator (e.g., 430) is adapted to select a second local protocol that is a different protocol from the first local protocol.

In an example system with two displays, a first cable (e.g. 411) is coupled between the output of the multistream generator 410 and the input of the first stream disaggregator 420, and a second cable (e.g., 412) is coupled between the second output of the first stream disaggregator 420 and the input of the second stream disaggregator 430. In the example system with two displays, received packets (e.g., encoded packets) of a first video stream are transmitted across the first cable (e.g., via a first switch local output) to the first display, and received packets (e.g., encoded packets) of a second video stream are transmitted across the first cable and the second cable (e.g., via a first switch system output and a second switch local output) to the second display.

In an example with at least two displays, the stream disaggregator 430 can include: a second receiver having a second receiver output, and having a second receiver input adapted to receive second input data from the first switch local output; a second selector having a second selector output, wherein the second selector is coupled to the second receiver, and wherein the second selector is configured to generate a second destination indication at the second selector output; and a second switch having a second switch local output and a second switch system output, wherein the second switch is coupled to the second receiver, and wherein the second switch is adapted to generate a transmission at the second switch local output in response to an indication of the second selector output and the second input data, wherein the second switch is adapted to generate a transmission at the second switch system output in response to the second input data.

In the example system with at least two displays, the stream disaggregator 430 can further include: comprising a second local controller coupled to the second switch local output, wherein the second switch local output is adapted for transmitting to a second display, and wherein the second local exporter is arranged to transmit data to the second display in response to a start command of a packet that includes the second destination indication as indicating the second display.

In another example system with at least two displays: a head unit is adapted to generate at least two video streams at an output of the head unit; and a multistream generator is coupled to the output of the head unit and is adapted to generate encoded packets that include information from the at least two video streams and to transmit the encoded packets to the source output, wherein the input data includes a packet from one of the at least two video streams. The encoded packets can be encoded by an encoder such as FDP encoder 372, 374, 376, and 378, and the encoded packets can be decoded by a receiver (e.g., receiver 422 of a downstream stream disaggregator, for example).

In an example system with at least two displays, the system includes: a head unit adapted to generate at least two video streams; a multistream generator coupled to the head unit, and adapted to generate encoded packets that comprise an identification field and that include information from the at least two video streams, and to couple the encoded packets to an output of the multistream generator; a first stream disaggregator having a first stream input coupled to the output of the multistream generator, the first stream disaggregator having a first output adapted to couple in accordance with a first local protocol a received encoded packet to a first display in response to an identification field of the received encoded packet indicating a node address of the first display, and the first stream disaggregator having a second output adapted to forward the received encoded packet in response to the identification field of the received encoded packet indicating a node address of other than a first display; and a second stream disaggregator having a second stream input coupled to the second output of the first stream disaggregator, the second stream disaggregator having a first output adapted to couple in accordance with a second local protocol the received encoded packet to a second display in response to an identification field of the received encoded packet indicating a second display node, and the second stream disaggregator having a second output adapted to forward the received encoded packet in response to an identification field of the received encoded packet indicating a node address other than a second display node address. The example system can further comprise: a third stream disaggregator having a third stream input coupled to the second output of the second stream disaggregator, the third stream disaggregator having a first output adapted to couple the received encoded packet to a third display in response to an identification field of the received encoded packet indicating a third display node address, and the third stream disaggregator having a second output adapted to forward the received encoded packet in response to an identification field of the received encoded packet indicating a node address other than a third display node address. The example system can further comprise: a first cable coupled between the output of the multistream generator and the first stream input; and a second cable coupled between the second output of the first stream disaggregator and the second stream disaggregator, wherein encoded packets of a first video stream are transmitted across the first cable to the first display, and wherein encoded packets of a second video stream are transmitted across the first cable and the second cable to the second display. In the example system, the first local protocol can be a different protocol from the second local protocol.

An example method for networking a multiple display system can include operations such as: transmitting, to a first display in response to an identification field of the received encoded packet indicating a node address of the first display, a first transmission including information of a received encoded packet; forwarding, in response to the identification field of the received encoded packet indicating a node address other than a first display node address, a second transmission including information of the received encoded packet; transmitting, to a second display in response to an identification field of the received encoded packet indicating a second display, a third transmission including information of the received encoded packet; and forwarding, in response to an identification field of the received encoded packet indicating a node address other than a second display node address, a fourth transmission including information of the received encoded packet. When the received encoded packet is a first encoded packet, the example method can further include: generating the first encoded packet in response to information received from a first video stream, and generating a second encoded packet in response to information received from a second video stream; transmitting the first encoded packet of the first video stream across a first cable to the first display; and transmitting the second encoded packet of the second video stream across the first cable and a second cable to the second display. The example method can further include: generating the first video stream in response to sensors of a vehicle that includes the first and second displays.

In an example system with three displays, a first cable (e.g. 411) is coupled between the output of the multistream generator 410 and the input of the first stream disaggregator 420, a second cable (e.g., 412) is coupled between the second output of the first stream disaggregator 420 and the input of the second stream disaggregator 430, and a third cable (e.g., 413) is coupled between the second output of the second stream disaggregator 430 and the input of the third stream disaggregator 440. In the example system with three displays, received encoded packets of a first video stream are transmitted across the first cable (e.g., via a first switch local output) to the first display, received encoded packets of a second video stream are transmitted across the first cable and the second cable (e.g., via a first switch system output and a second switch local output) to the second display, and received encoded packets of a third video stream are transmitted across the first cable, the second cable, and the third cable (e.g., via a first switch system output, a second switch system output and a third switch local output) to the third display.

In accordance with the examples described herein, additional displays and video streams can be added to a multiple display unit without (for example) increasing the number of cables connected to (e.g., physically connected to) the head unit 401 and/or the multistream generator 410.

Figure 5:
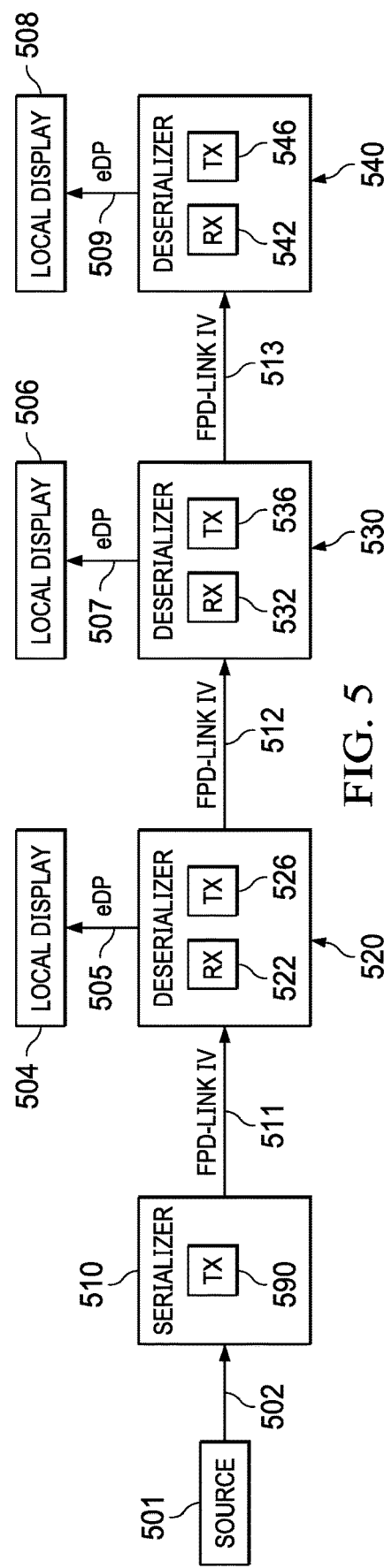
FIG. 5 is a block diagram of another example system that includes at least one stream disaggregator adapted to selectively forward transmissions between serially chained devices.

FIG. 5 is a block diagram of another example system that includes at least one stream disaggregator adapted to selectively forward transmissions between serially chained devices. For example, the system 500 is an example system that includes a source 501, a serializer 510 (coupled to source 501 via cable 502), a deserializer 520 (e.g., coupled locally to local display 504 via cable 505), a deserializer 530 (e.g., coupled locally to local display 506 via cable 507), and a deserializer 540 (e.g., coupled locally to local display 508 via cable 509).

The cables 511, 512, and 513 each include physical media, through which a system protocol (e.g., system bus) is implemented. The system protocol can be either unidirectional or bidirectional. In an implementation of a bidirectional system protocol: a first bidirectional serial link is established between serializer 510 and deserializer 520 across cable 511 (which is coupled between the serializer 510 and deserializer 520); a second bidirectional serial link is established between deserializer 520 and deserializer 530 across cable 512 (which is coupled between the deserializer 520 and deserializer 530); and a third bidirectional serial link is established between deserializer 530 and deserializer 540 across cable 513 (which is coupled between the deserializer 530 and deserializer 540).

The bidirectional serial link can be either asymmetric or symmetric. An example asymmetric bidirectional link includes an upstream speed (e.g., for bit traffic directed towards the serializer 510) that is 165 megabits per second and includes a downstream speed (e.g., for bit traffic directed away from the serializer 510) that is 13 gigabits per second. The asymmetric speeds allow high resolution video to be transmitted downstream at high bit rates (e.g., for transmitting various high-resolution video streams to selected displays), while still allowing a robust bidirectional system control and communication link between devices. An example asymmetric bidirectional link includes symmetric data speeds, so that data can be transferred in either direction at a full rate.

In an example, the source 501 is a source such as head unit 401. The source 501 is coupled to the serializer 510 via cable 502. Cable 502 is arranged to carry at least one video stream in accordance with a protocol such as the MIPI CIS.

In the example, the serializer 510 is a serializer such as multistream generator 410. The serializer 510 includes a transmitter 590 such as transmitter 390, which is adapted to transmit a multistream (e.g., which is generated by the serializer 510 and that includes reformatted information of the at least one video stream carried across a cable 502), so that the deserializer 520 can receive and process (e.g., process portions of) the transmitted multistream.

In the example, the deserializer 520 is a deserializer such as stream disaggregator 420. The deserializer 520 is coupled to the serializer 510 via cable 511. The deserializer 520 includes a receiver 522 (such as receiver 422) that is arranged to receive information transmitted by the transmitter 590. The deserializer 520 includes a transmitter 526 (such as stream forwarder 426) that is arranged to transmit information received from the transmitter 590. Cable 511 is arranged to carry a multistream output transmitted by the transmitter 590 in accordance with a protocol such as FPD-link IV. The deserializer 520 is coupled locally to local display 504 (such as local display 404) via cable 505. Cable 505 is arranged to carry a selected video stream in accordance with a protocol such as eDP (extended display protocol).

In the example, the deserializer 530 is a deserializer such as stream disaggregator 430. The deserializer 530 is coupled to the serializer 520 via cable 512. The deserializer 530 includes a receiver 532 (such as receiver 422) that is arranged to receive information transmitted by the transmitter 526. The deserializer 530 includes a transmitter 536 (such as stream forwarder 426) that is arranged to transmit information received from the transmitter 526. Cable 512 is arranged to carry a multistream output transmitted by the transmitter 526 in accordance with a protocol such as FPD-link IV. The deserializer 530 is coupled locally to local display 506 (such as local display 406) via cable 507. Cable 507 is arranged to carry a selected video stream in accordance with a protocol such as eDP.

In the example, the deserializer 540 is a deserializer such as stream disaggregator 440. The deserializer 540 is coupled to the serializer 530 via cable 513. The deserializer 540 includes a receiver 542 (such as receiver 422) that is arranged to receive information transmitted by the transmitter 536. The deserializer 540 optionally includes a transmitter 546 (such as stream forwarder 426) that is arranged to transmit information received from the transmitter 536. Cable 513 is arranged to carry a multistream output transmitted by the transmitter 536 in accordance with a protocol such as FPD-link IV. The deserializer 540 is coupled locally to local display 508 (such as local display 408) via cable 509. Cable 509 is arranged to carry a selected video stream in accordance with a protocol such as eDP.

When, for example, the last deserializer in a chain only receives data intended (e.g., addressed) for display on the respective local display that is coupled locally to the last deserializer, the last deserializer need not include a switch such as switch 427.

Modifications are possible in the described embodiments, and other embodiments are possible, within the scope of the claims.

What is claimed is:

1. A system, comprising:
  a head unit adapted to generate at least two video streams;
  a multistream generator coupled to the head unit, and adapted to generate encoded packets that comprise an identification field and that include information from the at least two video streams, and to couple the encoded packets to an output of the multistream generator;
  a first stream disaggregator having a first stream input coupled to the output of the multistream generator, the first stream disaggregator having a first output adapted to couple in accordance with a first local protocol a received encoded packet to a first display in response to an identification field of the received encoded packet indicating a node address of the first display, and the first stream disaggregator having a second output adapted to forward the received encoded packet in response to the identification field of the received encoded packet indicating a node address of other than a first display; and
  a second stream disaggregator having a second stream input coupled to the second output of the first stream disaggregator, the second stream disaggregator having a first output adapted to couple in accordance with a second local protocol the received encoded packet to a second display in response to an identification field of the received encoded packet indicating a second display node, and the second stream disaggregator having a second output adapted to forward the received encoded packet in response to an identification field of the received encoded packet indicating a node address other than a second display node address.

2. The system of claim 1, further comprising:

a third stream disaggregator having a third stream input coupled to the second output of the second stream disaggregator, the third stream disaggregator having a first output adapted to couple the received encoded packet to a third display in response to an identification field of the received encoded packet indicating a third display node address, and the third stream disaggregator having a second output adapted to forward the received encoded packet in response to an identification field of the received encoded packet indicating a node address other than a third display node address.

3. The system of claim 1, comprising:

a first cable coupled between the output of the multistream generator and the first stream input; and a second cable coupled between the second output of the first stream disaggregator and the second stream disaggregator, wherein encoded packets of a first video stream are transmitted across the first cable to the first display, and wherein encoded packets of a second video stream are transmitted across the first cable and the second cable to the second display.

4. The system of claim 1, wherein the first local protocol is a different protocol from the second local protocol.

* * * * *